(12) United States Patent
Gao (10) Patent No.: US 7,136,466 B1
(45) Date of Patent: Nov. 14, 2006

(54) DSL INTEGRATED CALL WAITING

(75) Inventor: Xiaofeng Gao, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 202 days.

(21) Appl. No.: 10/159,306

(22) Filed: May 30, 2002

(51) Int. Cl.
*H04M 11/00* (2006.01)

(52) U.S. Cl. .............................. 379/93.23; 379/93.35; 379/90.01; 379/93.08; 379/93.24; 370/352

(58) Field of Classification Search ............ 379/93.23, 379/93.35, 93.17, 93.24, 93.25, 93.01, 93.08, 379/90.01, 142.01, 142.06, 142.08, 142.15; 370/352

See application file for complete search history.

(56) References Cited

U.S. PATENT DOCUMENTS

| | | | |
|---|---|---|---|
| 5,483,588 A | 1/1996 | Eaton et al. ................ 379/202 |
| 5,572,582 A | 11/1996 | Riddle ......................... 379/202 |
| 5,805,587 A * | 9/1998 | Norris et al. ................ 370/352 |
| 5,809,128 A * | 9/1998 | McMullin .............. 379/215.01 |
| 6,078,581 A * | 6/2000 | Shtivelman et al. ......... 370/352 |
| 6,141,413 A | 10/2000 | Waldner et al. ........... 379/93.23 |
| 6,272,214 B1 | 8/2001 | Jonsson ....................... 379/202 |
| 6,275,575 B1 | 8/2001 | Wu ........................ 379/202.01 |
| 6,320,857 B1 * | 11/2001 | Tonnby et al. .............. 370/352 |
| 6,345,047 B1 * | 2/2002 | Regnier ....................... 370/352 |
| 6,366,661 B1 * | 4/2002 | Devillier et al. ....... 379/211.01 |
| 6,463,131 B1 | 10/2002 | French-St. George et al. ....................... 379/88.23 |
| 6,603,840 B1 * | 8/2003 | Fellingham et al. ..... 379/93.23 |
| 6,677,976 B1 | 1/2004 | Parker et al. ............ 348/14.08 |
| 6,724,871 B1 * | 4/2004 | Maytal ..................... 379/93.08 |
| 6,757,732 B1 | 6/2004 | Sollee et al. ................ 709/227 |
| 2002/0006194 A1 * | 1/2002 | Maytal ................... 379/399.01 |
| 2003/0026402 A1 * | 2/2003 | Clapper .................... 379/93.23 |
| 2003/0043787 A1 * | 3/2003 | Emerson, III ............... 370/352 |
| 2003/0112930 A1 * | 6/2003 | Bosik et al. .............. 379/88.17 |
| 2003/0112931 A1 * | 6/2003 | Brown et al. ............ 379/93.23 |
| 2003/0179743 A1 * | 9/2003 | Bosik et al. ................. 370/352 |
| 2003/0185360 A1 | 10/2003 | Moore et al. |
| 2004/0086100 A1 | 5/2004 | Moore et al. |

OTHER PUBLICATIONS

"Instant Messaging" notation made on Information Disclosure Statement submitted in conjunction with this document.
Pending U.S. Appl. No. 09/416,054, filed Oct. 12, 1999; with inventors: Li Zhang, Alpharetta GA; Jeffrey P. Cassanova, Hiram, GA; Alan R. Blackburn, Woodstock, GA; Robert B. Collicott, Alpharetta, GA.
US Patent Application Entitled: Integrated Chat Client with Called Party Choice; filed May 30, 2002; U.S. Appl. No. 10/159,377.
US Patent Application Entitled: Integrated Chat Client with Calling Party Choice; filed May 30, 2002; U.S. Appl. No. 10/159,314.

* cited by examiner

*Primary Examiner*—Stella Woo
(74) *Attorney, Agent, or Firm*—Thomas, Kayden, Horstemeyer & Risley, LLP (57) ABSTRACT

Phone system for a digital subscriber line integrated call waiting service are provided. A representative phone system includes a digital subscriber line routing system operable to check an application server for accessibility of a called party digital subscriber line associated with a called party. The application server is coupled to the internet and is operable to prompt the called party to answer the incoming call over the called party digital subscriber line when the called party digital subscriber line is accessible. The voice call is connected upon the called party choosing to answer the incoming call over the called party digital subscriber line.

50 Claims, 5 Drawing Sheets

DSL INTEGRATED CALL WAITING

FIELD OF THE INVENTION

The present invention is generally related to telecommunications and more particularly to the integration of telephone systems and digital subscriber lines.

DESCRIPTION OF THE RELATED ART

The telecommunications industry has undergone rapid changes in the past several years. With the development of the advanced intelligent network (AIN), telephone companies are poised to offer a multitude of new services to subscribers. Typically, AINs provide a more flexible handling of telephone calls. This flexibility is provided by a complex packet-switched network which allows for high speed communication and high volume traffic. One example of an AIN is further described in U.S. Pat. No. 5,701,301 and U.S. Pat. No. 5,838,774, each of which is hereby incorporated by reference.

AIN embodiments in the United States use a signaling system 7 (SS7) protocol to transport messages. Instead of circuit switching, the AIN relies on soft switching to provide high speed routing for telephone calls. The AIN comprises service switching points (SSPs), service nodes (SNs), signal transfer points (STPs), and service control points (SCPs). An SSP is typically an AIN-compatible switching office. The SN is a smart termination device that assesses incoming call information and make appropriate connections. The SSPs are connected by a number of STPs which transfer data among the SSPs and between the SSPs and SCPs. The STPs can generally be described as the routers which read the packet and transfer it to the called party SSP. Finally, the SCP is typically a fault tolerant computer that is coupled to a central database. This central database comprises a host of subscriber and routing information.

For better understanding a call routing sequence on an SS7 network will now be described. Typically, when a call is placed a calling party dials a telephone number and an SSP receives the place call request and routes it to the proper SSP associated with the called party. When the called party SSP receives the call request, it causes a trigger to fire. This trigger then causes the SSP to send a query across the STPs to an SCP. The query typically comprises asking the SCP how the call should be handled, such as specific subscriber instructions and any other specific routing information that is necessary. After receiving handling information from the SCP, the SSP uses these instructions to create a packet to send across the STPs to the called party SSP. The called party SSP then triggers and asks the SCP for subscriber-specific handling information for the called party. Typically the SCP will merely instruct the SSP to connect the call, however, the called party may have special instructions for incoming calls. However, these instructions have typically not included a reasonable mechanism by which to connect an incoming call while retaining a connection to a call already connected.

Therefore, there is a need for systems and method that address these and/or other perceived shortcomings of the prior art.

SUMMARY OF THE INVENTION

One embodiment, among others, of the present invention provides a digital subscriber line integrated call waiting service. A representative telephone system checks an application server for accessibility of a called party digital subscriber line associated with a called party. The application server is coupled to the internet and is operable to prompt the called party to answer the incoming call over the called party digital subscriber line when the called party digital subscriber line is accessible. The voice call is connected upon the called party choosing to answer the incoming call over the called party digital subscriber line.

An example method for connecting phone calls includes: receiving a call request to a called party having a digital subscriber line; checking an application server for accessibility of the called party digital subscriber line; and, prompting the called party to answer an incoming call over the called party digital subscriber line when the called party digital subscriber line is accessible.

An example method for receiving phone calls is provided, whereby the method includes: receiving on a computer having a digital subscriber line connection to a packet switched network, a prompt indicating an incoming analog phone call; and choosing to connect the incoming analog phone call over the digital subscriber line connection.

Other systems, methods, features, and advantages of the present invention will be or become apparent to one with skill in the art upon examination of the following drawings and detailed description. It is intended that all such additional systems, methods, features, and advantages included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

Moreover, in the drawings, like reference numerals designate corresponding parts throughout the several views.

DETAILED DESCRIPTION OF THE PREFERRED EMBODIMENTS

The invention now will be described more fully with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1:
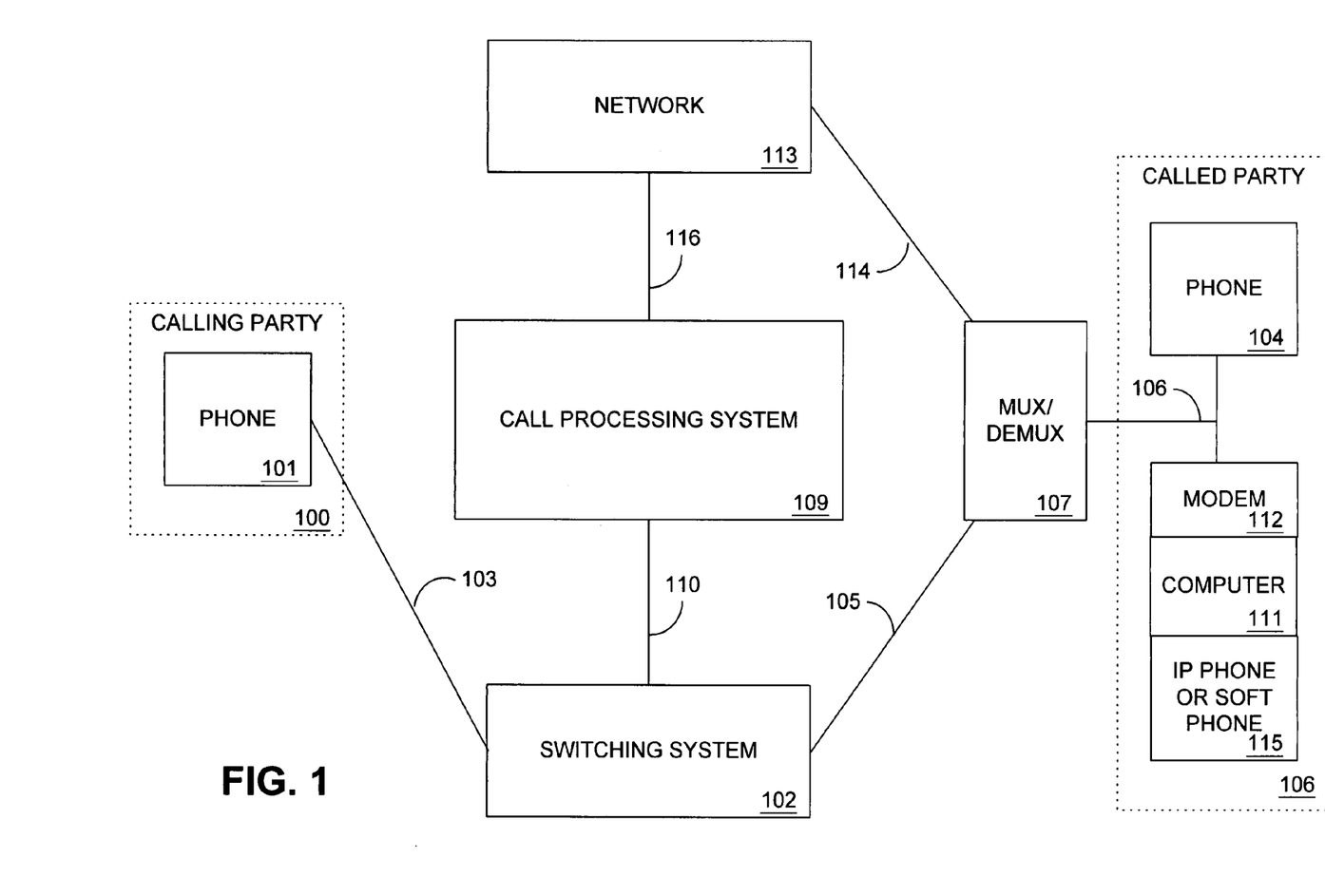
FIG. 1 is a block diagram illustrating a first embodiment, among others, of the present invention.

25. Referring now to FIG. 1, shown is a block diagram of one embodiment, among others, of the present invention. In this embodiment a calling party location 100 includes a standard plain-old telephone service (POTS) telephone 101 operating substantially within the POTS frequency range. The POTS frequency range is typically defined as the frequency range of 0 to 4 kilohertz (kHz), which contains substantially the range of frequencies which are audible to the human ear.

The phone 101 is typically connected to a switching system 102 by a connection 103. The switching system routes calls placed by a calling party to a called party telephone 104. When a digital subscriber line (DSL) is present, the called party telephone is connected to the switching system 102 through connections 105, 106, and multiplexer/demultiplexer 107. The called party telephone is typically a standard POTS telephone and resides at a called party location 108. The switching system 102 typically includes a network of switches which are connected to a call processing system 109 through a connection 110. The multiplexer/demultiplexer 107 could also be viewed as being contained within the switching system 102.

The called party DSL connection can include a computer 111 coupled to a modem 112. The modem 112 typically allows the computer 111 to send and receive information by coding data in a frequency range that is above the POTS frequency range. In this way, both the phone 104 and the computer 111 can use a single subscriber line. The multiplexer/demultiplexer 107 then receives the multiplexed signal through connection 106 and demultiplexes the signal, sending the high frequency data signal to the network 113 across connection 114, and the POTS frequency signal to the switching system 102 across connection 105.

The computer 111 may also include a conventional internet protocol (IP) phone 115. The IP phone 115 typically sends voice information on the higher frequency data signal created by the modem 112. Thus, under normal conditions the IP phone 115 is required to be connected to another IP phone, since a POTS frequency range device generally cannot translate the higher frequency voice information into the audible POTS frequency range.

Alternatively, the IP phone 115 could be a "soft phone." As known to those skilled in the art, soft phones are not physical phones, but are merely a software representation of the functionality of a physical phone running on a computer, typically utilizing a speaker and microphone of the computer. Often the soft phone has a graphical user interface (GUI) based upon the appearance of a physical phone, which facilitates use of the soft phone. However, it is not necessary that a GUI be used to represent the soft phone nor is it necessary that the GUI is based upon the appearance of a physical phone.

During operation, the switching system 102 can receive call routing information which is stored on the call processing system 109. Further, the call processing system 109 can store any subscriber-specific information related to call handling. In other words, if the called party has subscribed to caller-identification (caller-ID), the call processing system 109 instructs the switching system 102 to include a caller-ID information packet with the call notification sent to the caller on line 105. The call notification typically includes an aural prompt such as ringing, however, it can include other sensory prompts, such as vibration, among others. A number of other services can be provided to subscribers. A few of these include call-return, call-forwarding, call-waiting, call-waiting disabled, and caller-ID block, wherein a called party can subscribe to a specific service that can be provided to the called party without necessarily providing the service to all users of the phone system.

Another service that can be provided to the called party is a DSL integrated call waiting service, which is embodied in the present invention. Typically, when the calling party places a call, the switch in the switching system 102 that is associated with the calling party can, as necessary, query the call processing system 109 and can route the call to the switch associated with the called party. The switch associated with the called party can receive the call, but a termination busy (T_Busy) trigger will fire when the called party telephone 104 is busy.

The T_Busy trigger causes the switch to send a query to the call processing system 109 to request handling information. The call processing system 109 then checks a subscriber database and finds that the called party subscribes to the DSL integrated call waiting service. When the called party subscribes to the DSL integrated call waiting service, the call processing system 109 can search the network 113 via connection 116 to find out whether the called party has a computer 112 with an active DSL session on line 114, through multiplexer/demultiplexer 107.

Alternatively, the computer 111 could include a client application that, upon activating a DSL session, registers the computer 111 with the call processing system 109. Thus, the call processing system 109 could merely search its own registration database to ascertain whether an active DSL session is available at the called party computer 111.

When there is an active DSL session at the called party computer 111, the call processing system 109 can obtain the internet protocol (IP) address of the called party. After obtaining the IP address, the call processing system 109 can push information to the called party computer 111 IP address. An application, such as a casting client or a chat client, on the called party computer 111 could facilitate the information being pushed, or the called party computer 111 could be set up to accept the pushed information from the call processing system 109.

The information sent to the computer 111 can be obtained through a number of different sources, such as a customer database, internet search, or even through an agreement with an internet service provider to use their customer database. In one example, the information would typically at least include a selectable prompt that textually asks whether the called party would like to connect the telephone call over the DSL connection. Alternatively, the prompt could further include or be accompanied by other selectable options, such as hold, send to voice-mail, playing a customized busy announcement, sending a short instant messaging (IM) message to the caller, disconnect current phone call and connect incoming call, ignore incoming call, etc. The information could further include personal information of the calling party. In one embodiment, among others, this personal information could include a name and telephone number of the calling party, such as is done with standard caller-identification. However, the personal information could also include the address of the calling party, or a universal resource locator (URL) corresponding to a web page of the calling party, or even a photograph of the calling party.

Further, in one embodiment, among others, the present invention includes a system whereby the calling party can control what information is sent to the calling party. The calling party could access a personal information file through the internet and adjust his/her personal profile to include or exclude address, web pages, telephone number, etc. Thus, when the calling party places a call, the information included in the personal profile can automatically be sent to the called party. Alternatively, the calling party may be given access to adjust his/her personal profile via an interactive voice response menu system, a telephone service provider operator, or any other system that allows interaction between the user and a remote database.

If the called party chooses to talk to the calling party over DSL, the call processing system can use the IP address of the called party to route the call through the network 113. One skilled in the art will recognize that because the call is being routed over a packet switched network 113 there is a bridge between the POTS circuit-switched phone protocol and the high-frequency packet-switched internet protocol. Thus, before passing the call through the network, the call processing system will translate the information into packets that will be understood by network 113 and the IP phone 115.

Figure 2:
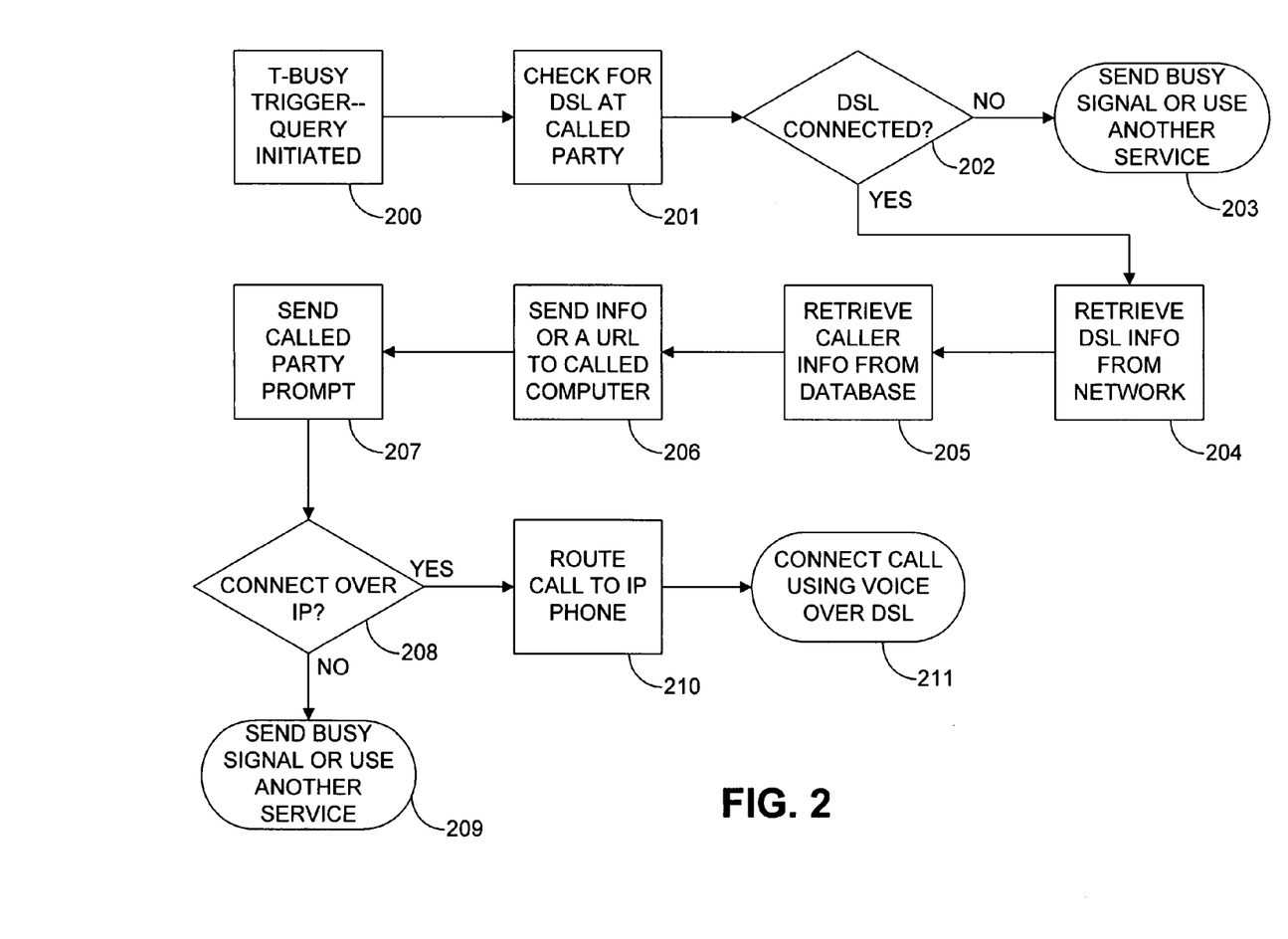
FIG. 2 is a flowchart showing the operation of the first embodiment of the present invention, among others.

Referring now to FIG. 2, shown is a flowchart illustrating the operation of the first embodiment, among others, of the invention. Step 200 shows that the first step is for a T_Busy signal to be triggered. As shown in step 201, the T_Busy signal causes the system to check for an active DSL connection at the called party computer 111. The call processing system 109 then branches, as shown by step 202, according to whether or not an active DSL connection is present. If there is no active DSL connection present the call processing system 109 will either instruct the switching system 102 to send a busy signal to the calling party or attempt to connect another service, as shown in step 203, such as voice mail.

If there is an active DSL connection present at the called party location, the DSL integrated call waiting service can continue to attempt to establish a connection by first retrieving information about the DSL connection, such as an IP address, as shown by step 204. First the call processing system 109 retrieves calling party information from a network 113 database, as shown by step 205. Then, at step 206, the call processing system 109 sends the calling party information and/or a URL to the called party computer 111 via the DSL connection. The call processing system 109 then sends a prompt to the called party computer 111, as shown by step 207. The called party can choose, according to step 208, to connect the call over the DSL connection. If the party chooses not to connect the call over the DSL connection, the call processing system 109 will instruct the switching system 102 to send a busy signal or try another service, as shown by step 209. Alternatively, these other service choices may be moved into the prompt and decision steps 207, 208, respectively.

If the called party chooses to connect the call over the DSL connection, the call processing system 109 routes the call to the called party IP phone 115, as shown in step 210. This step includes translating the circuit switched voice of POTS into a packet switched voice signal that can be sent over a packet network. Routing the call to the called party IP phone 115 further includes using the DSL information retrieved from the network 113 in step 204 to route the packetized voice over the packet network 113. As shown by step 211, the last step would be to connect the call using voice over DSL after the IP phone 115 is answered.

Figure 3:
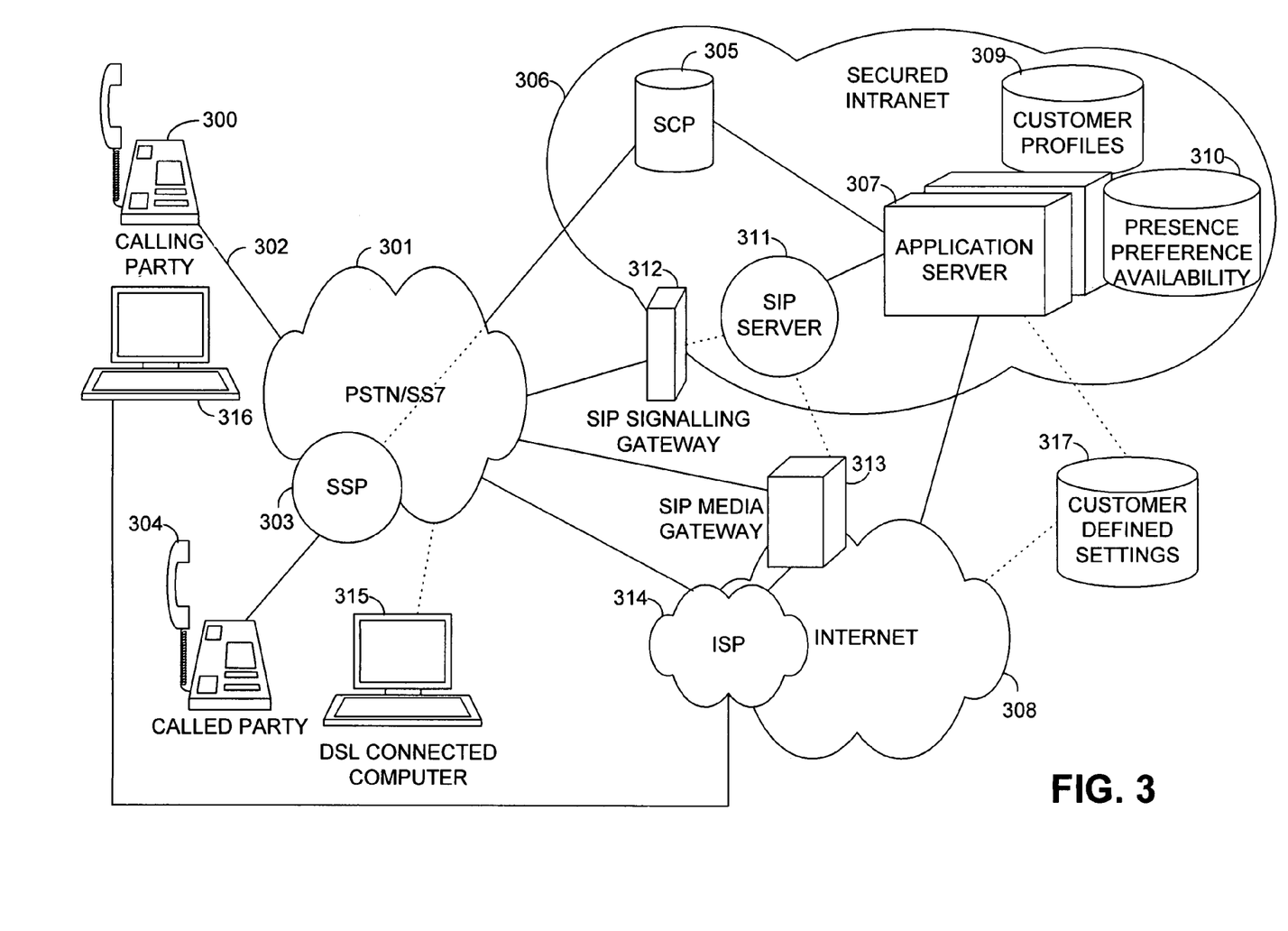
FIG. 3 is a schematic diagram illustrating one embodiment, among others, of the present invention.

Referring now to FIG. 3, shown is a schematic diagram illustrating one embodiment, among others, of the present invention. A calling party telephone 300, such as a standard POTS telephone, can be connected to the public switched telephone network (PSTN) 301 by line 302. The PSTN 301 includes numerous service switching points (SSPs) 303, which are central switching offices that can connect a telephone call from the calling party telephone 300 to a called party telephone 304 using handling information received from a service control point (SCP) 305.

The SCP is typically a fault tolerant computer, which preferably resides on a secured intranet 306 and contains a database which keeps track of call routing information and telephone customer profile information. The SCP can be connected to an application server 307 which can be configured to collect information about customer applications such as via the internet 308, for example, among others. The application server 307 is preferably connected to an internet customer profile database 309, which keeps track of internet customer IP and routing information. The application server 307 is further connected to a presence, preference and availability database 310 which maintains information on the accessibility of a plurality of DSL connections. The presence is defined according to whether or not the user's computer has an active DSL connection registered with the application server 307. The preference is defined by the user and can limit access of the telephone network to send information to the user's computer. Availability can be defined as the DSL connection being registered to be present however it may have initiated no activity for a pre-determined period of time.

The application server 307 in one embodiment, among others, can include a chat client server. The chat client server can be configured to serve as a presence and availability server 307 for a plurality of chat clients residing on subscriber computers. Thus, when a chat client is started on a called party computer 315, the chat client server can provide the presence and availability information to route a call through the packet switched network 308 to an IP phone associated with the computer 315.

One skilled in the art will recognize the abundance of chat clients presently available that may be used in conjunction with the present invention. Some of the more popular of these chat clients include: MSN Messenger, available from Microsoft, Corp. of Redmond, Wash.; Yahoo! Messenger, available from Yahoo!, Inc. of Sunnyvale, Calif.; AOL Instant Messenger, available from America Online, Inc. of Dulles, Va.; and Jabber Instant Messenger, available from Jabber, Inc. of Denver, Colo. One skilled in the art will further recognize that the Jabber Instant Messenger comprises an open systems architecture. Open systems architectures generally allow a user to manipulate the source program to tailor the client to specific needs of each individual user. Used in this context, the open system architecture could facilitate the development of a custom application to be provided with the integrated chat client. One skilled in the art will further recognize the existence of UNIX and LINUX chat programs and other programs, such as text messaging on wireless phones, that allow text communication between two parties. In alternative embodiments, each of these alternative text communication applications are intended to be included within the scope of the present invention. Generally, as understood herein, chat clients at least provide some type of text-based communication, in accordance with the preferred embodiment of the invention.

The application server 307 in one embodiment, among others, of the present invention, can be connected to a session initiation protocol (SIP) server 311. SIP is a protocol which allows the circuit switched telephone call to be connected over the packet switched protocol used on most networks. The SIP server 311 is in communication with an SIP signaling gateway 312 and an SIP Media Gateway 313. The SIP signaling gateway 312 allows the SIP server 311 to communicate with the SS7 protocol packet network included in the PSTN 301 by translating the SS7 protocol to SIP protocol. The SIP Media gateway 313 can reside on the internet 308, and is configured to receive the POTS band circuit switched voice signal from the PSTN 301, and to convert the POTS band circuit switched voice signal to a packet switched signal, and convert the packet switched voice from the computer 315 to circuit switched voice. The SIP server 311 sends the address information to the SIP media gateway 313 to be used in addressing the packetized voice data signal, such that the signal will arrive at the intended subscriber.

The SIP media gateway 313 can be connected to an internet service provider (ISP) 314, and is configured to send the converted packetized voice signal to the ISP 314. The ISP 314 provides high speed DSL internet service to a number of subscribers over the standard PSTN twisted pair telephone line. The ISP 314 receives the packetized voice signal and sends it through the PSTN 301 to a DSL connected computer 315 at the called party premises. Software on the DSL connected computer 315 can then decode the signal and output the voice signal. Moreover, the software on the DSL connected computer 315 can compress and send a voice signal through the network to the calling party in the reverse of the manner discussed above.

The SIP server 311 works together with the SCP 305 and the application server 307 to provide the called party another option for answering the phone when the called party analog phone 304 is in use. The SSP 303 has a plurality of triggers that, when fired, will cause the SSP 303 to send a query to the SCP 305 for call handling information. When the called party analog phone 304 is busy, the SSP 303 triggers a T_Busy signal and it sends a query to the SCP 305. The SCP 305 is configured to check the telephone customer database (not shown) and obtain information about how to handle the call. If the called party subscribes to DSL integrated call waiting, the SCP 305 then queries the application server 307 to find out if the called party has an accessible DSL connection. If not, the DSL integrated call waiting process ends and the SCP 305 may try other services if there is no DSL connection accessible.

If the called party has an accessible DSL connection, the application server 307 then retrieves the called party IP address from the customer profiles 309 and sends a prompt to the called party computer 315. The prompt typically could include call waiting information about the calling party and ask the called party whether he or she would like to connect the call over the DSL connection. The prompt could also include options regarding other services to which the called party subscribes, or other information that could be personalized by the calling party. This personalization could be accomplished by using a calling party computer 316, to connect over the internet 308 to update a customer defined settings database 317, which the application server 307 would access. Alternatively, the personalized information could be stored in a customer defined settings database coupled to the application server 307 on the telephone service provider intranet 306 and the calling party could use the calling party computer 316 to adjust the database over the internet 308. Further, one skilled in the art will recognize that an interactive voice response (IVR) system could even facilitate the updating of the personalized information over the telephone.

If the called party does not wish to connect the call over the DSL connection, another service may be offered. However, if the called party wishes to connect the call over the DSL connection, the application server 307 notifies the SCP 305, which instructs the SSP 303 to route the call using the SIP server 311. The SIP server 311, however, cannot understand the SS7 signaling protocol, thus an SIP signaling gateway 312 is used to translate the SS7 protocol into the SIP protocol. The SIP server 311 then retrieves the IP address of the called party computer 315 from the application server 307 using the signaling information received from the SIP signaling gateway 312. The SIP server then passes this information to the SIP media gateway 313. The SIP media gateway 313 translates the circuit switched voice signal into a packet switched voice signal able to be transferred over IP, and send the packetized voice to the called party computer 315 using the IP address information received from the application server 307.

One skilled in the art should understand that this invention is not intended to be limited to merely the SIP standard interface used in the present embodiment. As one skilled in the art will recognize, there are other interface protocols that could be substituted for the SIP interface, such as media gateway control protocol and H.323. Each of these alternative interface protocols, among others, are intended to be within the scope of the present invention.

Figure 4:
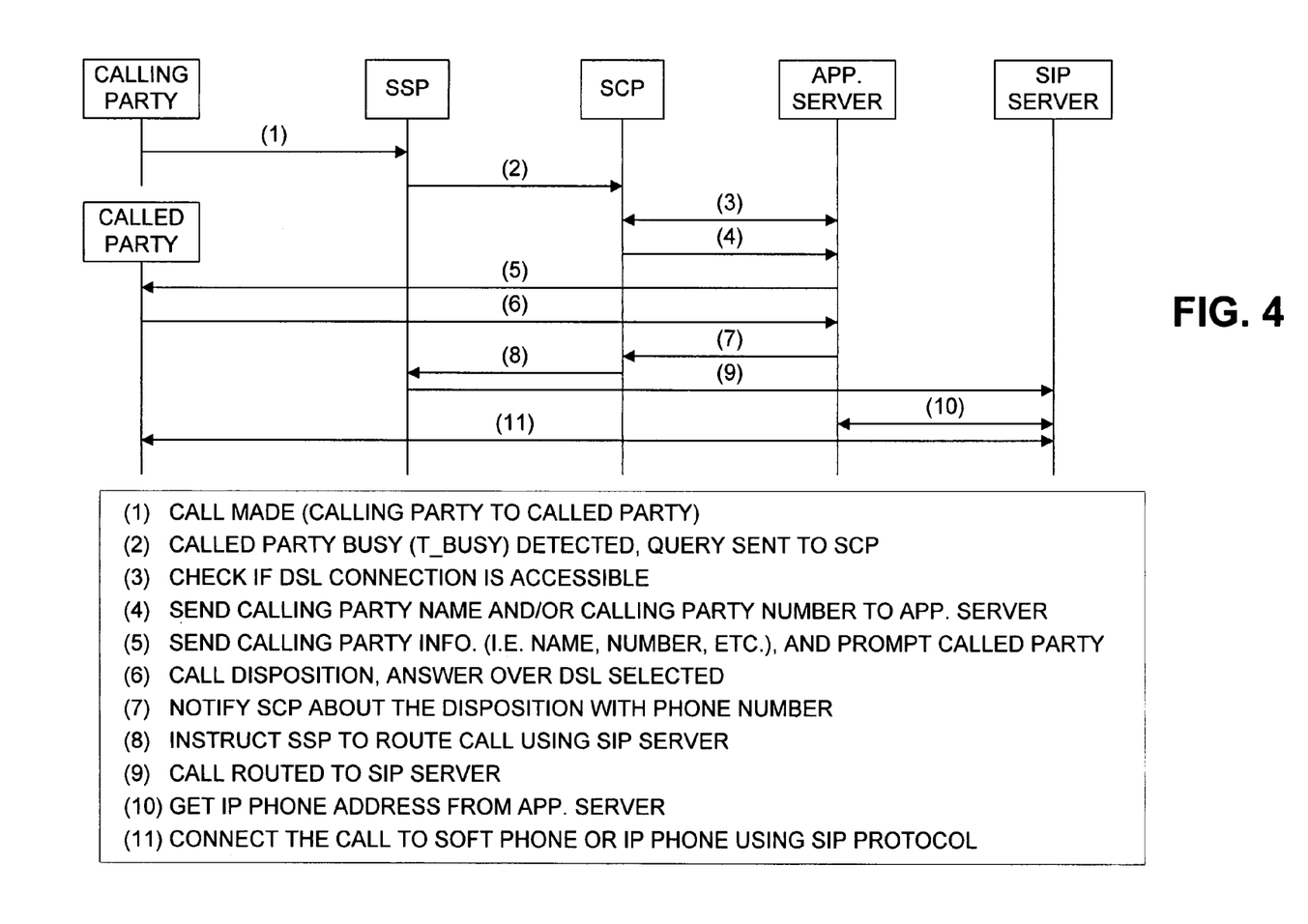
FIG. 4 is a call flow diagram detailing the operation of the embodiment shown in FIG. 3.

Referring now to FIG. 4, shown is an example call flow diagram according to one embodiment, among others, of the system of FIG. 3. To start the call flow, in step one a call is made by a calling party to a called party. A connection request associated with the call arrives at the called party SSP 303. If the called party telephone 304 is busy, a T_busy signal will be triggered, which initiates a query to be sent from the called party SSP 303 to the SCP 305, according to step two.

When the SCP 305 receives the query from the SSP 303, the SCP 305 checks its database. Upon checking the telephone customer database, the SCP 305 finds that the called party subscribes to a number of services for handling calls when the line is busy, including DSL integrated call waiting. In step three, The SCP 305 then sends a query to the application server 307 to check if a DSL connection associated with the called party telephone number is accessible. If the DSL connection associated with the called party telephone number is accessible, the next step has the SCP 305 sending the calling party name and/or the calling party number to the application server 307.

Once the application server 307 has received the calling party name and/or number, the application server 307 can retrieve personal information about the calling party from its customer database, or from another source. After retrieving this personal information on the calling party, the fifth step involves pushing the personal information to the called party DSL connected computer 315 along with a prompt. The prompt typically asks the party to choose the method of call disposition. The choices for call disposition can typically be those services to which the called party subscribes, including the DSL integrated call waiting service. However, the telephone service provider could also provide all service choices to the called party computer 315 together with prices and charge the called party based upon the disposition of the call.

After providing the prompt, the next step has the user selecting to talk to the calling party using voice over DSL. The application server 307 can then receive the called party choice and notify the SCP 305 about the disposition of the call and the phone number of the calling party. In step eight, the SCP 305 instructs the SSP 303 to route the call using the SIP server 311. Next, the SIP server 311 can retrieve the called party IP phone address from the application server 307 in order to route the call to the correct DSL connected computer 315. Finally, after retrieving the called party IP phone address, the SIP server 311 can establish a connection between the called party and the calling party. The called party will typically still be using a standard analog POTS telephone 300, while the called party will be using a DSL connected IP phone or soft phone, the protocol gap being bridged by the SIP signaling gateway 312 and the SIP media gateway 313.

Figure 5:
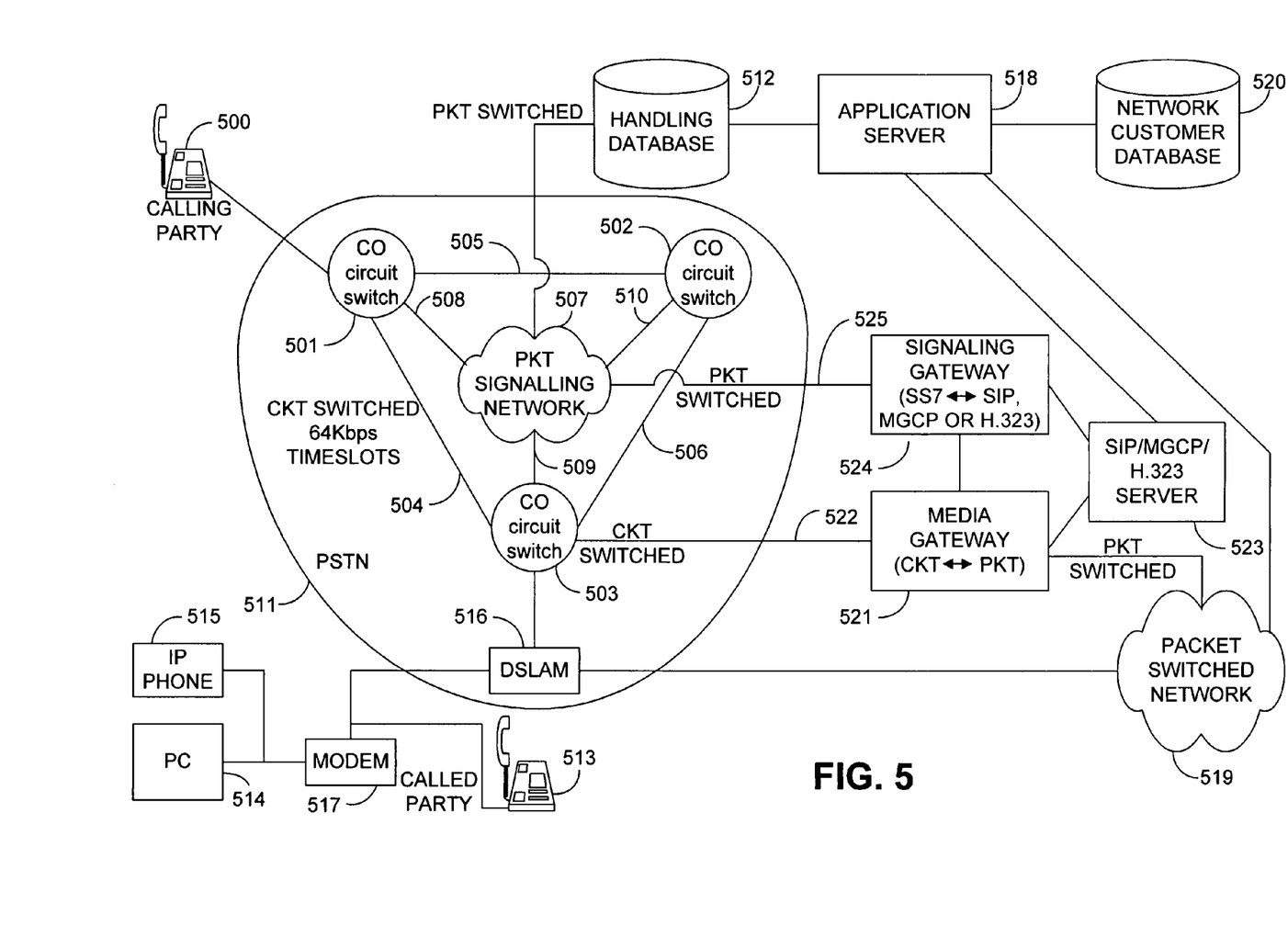
FIG. 5 is a schematic diagram illustrating an alternative embodiment of the present invention.

Referring now to FIG. 5, shown is a schematic view of a second embodiment, among others, of the present invention. A calling party phone 500 is coupled to a central office switching station 501. The central office switching station 501 is typically coupled to a plurality of other switching stations 502, 503 by a plurality of circuit switched lines 504, 505, 506. Each of these circuit switched lines 504, 505, 506 has a plurality of 64 kbps timeslots for each of a plurality of connected calls. Each of the central office switching stations 501, 502, 503 are further coupled to a packet signaling network 507 via packet switched lines 508, 509, 510. The packet signaling network uses the SS7 protocol, and handles the signaling and routing information for each of the plurality of telephone calls connected across the PSTN 511.

In order to facilitate the handling of the plurality of telephone calls, the packet signaling network 507 is coupled toga handling database 512. The handling database 512 typically keeps track of customer specific subscription information and routing and handling information for all of the telephone service provider customers. Typically, the handling database 512 looks up the handling information for the called party and instructs the central office switching station 503 to connect a call from the calling party phone 500 to the called party phone 513.

However, when the called party phone 513 is busy, one embodiment, among others, of the present invention is configured to check for a DSL connected computer 514 at the called party premises upon receiving a busy signal at the called party telephone 513. If the DSL connected computer 514 is accessible, the phone service is designed to prompt the user to connect the call to an IP phone 515. Thus, the DSL connection makes available higher bandwidths to connect the call, using a DSLAM 516 to multiplex high frequency data and low frequency voice together, with a modem 517 to modulate and demodulate the data signal, even though the called party telephone 513 is busy.

This service is provided by coupling the handling database to an application server, which is connected to a packet switched network, such as the internet. The application server 518 keeps track of which network subscribers have active DSL sessions on the network 519. Typically this could be done with a custom application residing on the called party computer 514. The custom application could sign onto the application server upon starting the custom application, where it can be registered with the network customer database 520. Alternatively, the application server may be able to search for a called party DSL connected computer at another site, such as an internet service provider, or some database residing on the network 519 itself.

Once the application server has ascertained that the called party DSL connected computer 514 is accessible, it can retrieve the calling party name and telephone number from the handling database 512. The application server can further retrieve other personal information about the calling party, through the network 519, an internal database, or some other database, and include the information in a prompt pushed to the called party computer 514. Pushing the prompt can be facilitated by retrieving the called party computer 514 IP address from the network customer database 520, and sending the prompt to a custom application residing on the called party computer 514.

A media gateway 521 to translate the circuit switched PSTN voice to and from the packet switched IP is included, so as to bridge the differences between the two networks. The media gateway is coupled to the central office circuit switch via a circuit switched line 522. The media gateway is also coupled to a protocol server 523, which provides routing instructions to the media gateway for inclusion with the packets sent to the called party computer 514. These routing instructions are received via a signaling gateway 524 coupled to the protocol server 523, and are provided to translate the signal switched SS7 protocol to the media protocol. The signaling gateway 524 is coupled to the packet signaling network 507 through a packet switched connection 525. These media protocol are typically referred to as VoIP, and as one skilled in the art will recognize, there exist numerous varieties of such media protocol that can be used in conjunction with the present invention.

Thus, when a call is placed by the calling party telephone 500, it is received at the central office circuit switch 501. The central office then sends a packet switched signal to the signaling network 507, indicating a call request has been received and requesting handling instructions. The signaling network 507 then relays this information to the handling database 512. The handling database notifies central office circuit switch 503 of the incoming call, and receives a query from the circuit switch 503 indicating that the called party telephone is busy. The handling database then examines the telephone customer profile and finds that the called party subscribes to DSL integrated call waiting. The database then queries the application server 518 to obtain the accessibility of a DSL connected called party computer 514.

If the DSL connected called party computer 514 is accessible, the application server sends a prompt to the called party computer 514. The prompt typically includes a variety of calling party information obtained through a coupled database. When the called party chooses to talk over the DSL connection, the application server 518 notifies the handling database 512 of the disposition, which in turn instructs the central office circuit switch 503 of the called party to route the call via the DSL line. The central office circuit switch 503 then routes the call over line 522 to the media gateway 521. The packet signaling network 507 routes the handling information over line 525 to the signaling gateway 524. The signaling gateway 524 translates the SS7 packets to the correct media and send the translated packets to the protocol server 523. The protocol server 523 in turn instructs the media gateway where to send the translated voice packets. The translated voice packets are then sent to the DSL connected called party computer 514 via the DSLAM 516 and the modem 517. The computer 514 or IP phone 515 then decodes and plays the packetized voice signal. Similarly, the computer 514 or IP phone 515 can also receive a called party voice. This called party voice is then encoded to be sent back through the network 519, translated, and transported by the PSTN to the calling party telephone 500.

The systems of the preferred embodiments described herein would allow a called party to answer a telephone call over a DSL connection. One advantage such systems could provide is the ability to provide a second telephone connection for incoming calls. A further advantage would be that the called party can maintain a conversation on the analog telephone line while connecting a telephone call on an IP phone. For example such a service could be invaluable to a parent who wishes to receive telephone calls while a son or daughter continues a conversation on the standard phone line, while only limiting outgoing calls. Moreover, this is done without necessitating the initiation of a second standard telephone line. Furthermore, the DSL integrated call waiting service would enable the called party to continue to use the internet functionality of the DSL connection. Thus, the called party can maintain two telephone conversations while experiencing only a relatively small amount of bandwidth loss over the DSL connection due to the displacement of the second voice call.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

What is claimed is:

1. A phone system, comprising:
    a telephone call detector; and
    a digital subscriber line routing system coupled to the telephone call detector to route an incoming analog phone call over a digital channel of a called party digital subscriber line connected to a packet switched network while retaining a connection to an analog phone call already connected over an analog channel of the called party digital subscriber line if the called party is engaged in an electronic chat session on the digital channel of the called party digital subscriber line, the digital subscriber line routing system sending a message to a called party computer having the electronic chat session prompting a user of the called party computer to indicate whether the incoming analog phone call should be directed to the called party computer over the digital channel, wherein the incoming analog phone call is directed to the called party computer if authorization is received by the user.

2. The phone system of claim 1, the digital subscriber line routing system comprising:
    an application server to register a user as having an active DSL session;
    an accessibility database coupled to the application server, the accessibility database comprising information about a plurality of digital subscriber lines associated with a plurality of users that are registered with the application server, accessibility of the called party digital subscriber line depending upon registration of the called party digital subscriber line;
    wherein:
    the telephone call detector generates a query for the digital subscriber line routing system to determine how the call is to be handled; and
    the telephone call detector includes a called party switch.

3. The phone system of claim 2, wherein the accessibility database further comprises information about whether each of the plurality of digital subscriber lines has an associated user that is available, accessibility of the called party digital subscriber line depending upon availability of the called party.

4. The phone system of claim 3, wherein the accessibility database further comprises information about whether the associated users prefer to receive voice calls over the digital subscriber line, accessibility of the called party digital subscriber line depending upon a preference of the called party.

5. The phone system of claim 2, wherein the application server is operable to provide a calling party information package associated with the calling party making the incoming call, the calling party information package being provided over a digital channel of a digital subscriber line to provide information on a calling party of an incoming analog phone call.

6. The phone system of claim 5, further comprising:
    a protocol server coupled to the telephone call detector and operable to obtain a called party network phone address associated with the called party and connect the incoming call over the called party digital subscriber line using a media translation protocol.

7. The phone system of claim 6, wherein the digital subscriber line routing system is operable to instruct the telephone call detector to route the incoming call using the protocol server if the called party is accessible.

8. The phone system of claim 7, wherein the protocol server connects the incoming call over a soft phone associated with the called party.

9. The phone system of claim 7, wherein the protocol server connects the incoming call over an internet protocol phone associated with the called party.

10. The phone system of claim 5, wherein the calling party information package includes a hyperlink to a web page containing personal calling party information.

11. The phone system of claim 10, wherein the web page containing personal calling party information is configurable by the calling party.

12. The phone system of claim 11, wherein the web page containing personal calling party information is configurable by the calling party over the internet.

13. The phone system of claim 5, wherein the calling party information package is pushed to a called party application to be displayed on a called party terminal associated with the called party.

14. The phone system of claim 1, wherein a calling party information package associated with a calling party making the incoming phone call is provided via a chat client.

15. The phone system of claim 14, wherein the chat client is an instant messaging client.

16. A method for connecting a phone call, comprising:
    responsive to detecting an incoming telephone call,
    evaluating accessibility of a called party digital subscriber line associated with a called party; and routing the incoming telephone call over a digital channel of the called party digital subscriber line responsive to the called party digital subscriber line being accessible, while retaining a connection to an analog phone call already connected over an analog channel of the called party digital subscriber line if the called party is engaged in an electronic chat session on the digital channel of the called party digital subscriber line, wherein a message is sent to a called party computer having the electronic chat session prompting a user of the called party computer to indicate whether the incoming analog phone call should be directed to the called party computer over the digital channel, wherein the incoming analog phone call is directed to the called party computer if authorization is received by the user.

17. The method of claim 16, wherein the evaluating step includes generating a query and checking an application server that registers a user as having an active DSL session.

18. The method of claim 17, further comprising:
providing a calling party information package associated with a chat client, the calling party information package being provided over a digital channel of a digital subscriber line to provide information on a calling party of an incoming analog phone call.

19. The method of claim 17, the evaluating step further comprising the step of:
checking an accessibility database for information about a plurality of digital subscriber lines associated with a plurality of users that are registered with the application server, to check accessibility of the called party digital subscriber line.

20. The method of claim 19, the evaluating step further comprising the step of:
checking an accessibility database for information about whether each of the plurality of digital subscriber lines has an associated user that is available, to check accessibility of the called party digital subscriber line.

21. The method of claim 20, the evaluating step further comprising the step of:
checking the accessibility database for information about whether the associated users prefer to receive voice calls over the digital subscriber line, to check accessibility of the called party digital subscriber line.

22. The method of claim 16, further comprising:
providing a calling party information package associated with the calling party making the incoming call.

23. The method of claim 22, further comprising:
pushing the personal calling party information to a called party application to be displayed on a called party terminal associated with the called party.

24. The method of claim 22, further comprising:
including a hyperlink to a web page containing personal calling party information.

25. The method of claim 24, further comprising:
allowing the calling party to configure the personal calling party information.

26. The method of claim 25, further comprising:
allowing the calling party to configure the personal calling party information over the internet.

27. The method of claim 16, further comprising:
connecting the incoming call over a soft phone associated with the called party.

28. The method of claim 16, further comprising:
connecting the incoming call over an internet protocol phone associated with the called party.

29. A method for answering a phone call, comprising:
using a computer having a digital subscriber line connection to a packet switched network; and
automatically receiving an incoming analog phone call over a digital channel of the digital subscriber line connection when the digital subscriber line is accessible by the called party and authorization is received from the called party, while retaining a connection to an analog phone call already connected over the digital subscriber line connection via an analog channel if the called party is engaged in an electronic chat session on the digital channel of the digital subscriber line connection, wherein a message is sent to a called party computer having the electronic chat session prompting a user of the called party computer to indicate whether the incoming analog phone call should be directed to the called party computer over the digital channel.

30. The method of claim 29, wherein the method further comprises:
using an internet protocol phone to talk over the digital subscriber line connection.

31. The method of claim 29, wherein the method further comprises:
using a soft phone to talk over the digital subscriber line connection.

32. The method of claim 29, wherein the method further comprises:
starting a custom application on the computer, such that an application server can locate the computer in an accessibility database.

33. The method of claim 29, further comprising:
receiving an information package at the computer, the information package comprising personal information about a calling party originating the incoming analog phone call, the calling party information package being provided over a digital channel of a digital subscriber line to provide information on a calling party of an incoming analog phone call.

34. The method of claim 33, wherein the personal information comprises a universal resource locator.

35. The method of claim 33, wherein the personal information comprises a telephone number associated with the calling party.

36. The method of claim 35, wherein the personal information comprises a name associated with the calling party.

37. The method of claim 36, wherein the personal information comprises a photograph of the calling party.

38. A computer readable medium having a program for connecting a phone call, the program comprising the steps of:
responsive to detecting an incoming telephone call, evaluating accessibility of a called party digital subscriber line associated with a called party; and
routing the incoming telephone call over a digital channel of the called party digital subscriber line responsive to the called party digital subscriber line being accessible, while retaining a connection to an analog phone call already connected over the called party digital subscriber line via an analog channel if the called party is engaged in an electronic chat session on the digital channel of the called party digital subscriber line, wherein a message is sent to a called party computer having the electronic chat session prompting a user of the called party computer to indicate whether the incoming analog phone call should be directed to the called party computer over the digital channel, wherein the incoming analog phone call is directed to the called party computer if authorization is received by the user.

39. The medium of claim 38, wherein the evaluating step includes generating a query and checking an application server that registers a user as having an active DSL session.

40. The medium of claim 39, the program further comprising:
providing a calling party information package associated with a calling party via a chat client.

41. The medium of claim 39, the evaluating step further comprising the step of:
checking an accessibility database for information about a plurality of digital subscriber lines associated with a plurality of users that are registered with the application server, to check accessibility of the called party digital subscriber line.

42. The medium of claim 41, the evaluating step further comprising the step of:
checking an accessibility database for information about whether each of the plurality of digital subscriber lines has an associated user that is available, to check accessibility of the called party digital subscriber line.

43. The medium of claim 42, the evaluating step further comprising the step of:
checking the accessibility database for information about whether the associated users prefer to receive voice calls over the digital subscriber line, to check accessibility of the called party digital subscriber line.

44. The medium of claim 38, the program further comprising:
connecting the incoming call over a soft phone associated with the called party.

45. The medium of claim 38, the program further comprising:
connecting the incoming call over an internet protocol phone associated with the called party.

46. The medium of claim 38, the program further comprising:
providing a calling party information package associated with the calling party making the incoming call, the calling party information package being provided over a digital channel of a digital subscriber line to provide information on a calling party of an incoming analog phone call.

47. The medium of claim 46, the program further comprising:
pushing the personal calling party information to a called party application to be displayed on a called party terminal associated with the called party.

48. The medium of claim 46, the program further comprising:
including a hyperlink to a web page containing personal calling party information.

49. The medium of claim 48, the program further comprising:
allowing the calling party to configure the personal calling party information.

50. The medium of claim 49, the program further comprising:
allowing the calling party to configure the personal calling party information over the internet.

* * * * *